(12) United States Patent
Hasegawa

(10) Patent No.: US 11,657,243 B2
(45) Date of Patent: May 23, 2023

(54) VEHICLE AND VEHICLE SYSTEM

(71) Applicant: TOYOTA JIDOSHA KABUSHIKI KAISHA, Toyota (JP)

(72) Inventor: Hideo Hasegawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/533,875

(22) Filed: Nov. 23, 2021

(65) Prior Publication Data

US 2022/0253622 A1 Aug. 11, 2022

(30) Foreign Application Priority Data

Feb. 8, 2021 (JP) .............................. JP2021-018279

(51) Int. Cl.
*G06K 7/14* (2006.01)
*G06F 16/955* (2019.01)
(52) U.S. Cl.
CPC ....... *G06K 7/1417* (2013.01); *G06F 16/9554* (2019.01)

(58) Field of Classification Search
CPC .......................... G06K 7/1417; G06F 16/9554
See application file for complete search history.

(56) References Cited

U.S. PATENT DOCUMENTS

| 2012/0047423 | A1* | 2/2012 | Tomkow | G06F 40/169 |
| | | | | 715/205 |
| 2015/0149307 | A1* | 5/2015 | Thukral | H04W 4/80 |
| | | | | 705/15 |
| 2021/0326550 | A1* | 10/2021 | Kappers | G06K 7/10861 |

FOREIGN PATENT DOCUMENTS

JP 2016-162155 A 9/2016

* cited by examiner

*Primary Examiner* — Laura A Gudorf
(74) *Attorney, Agent, or Firm* — Oliff PLC

(57) ABSTRACT

A vehicle includes one or more interface devices, and a member on which an image obtained by encoding digital data for giving guidance on a use method of the interface device to a user is printed, in which the member is disposed in a vicinity of the corresponding interface device.

14 Claims, 8 Drawing Sheets

CAR MODEL V001
https://car.manual.com/V001/manual.pdf
PAGE 28

VEHICLE AND VEHICLE SYSTEM

CROSS-REFERENCE TO RELATED APPLICATION

This application claims priority to Japanese Patent Application No. 2021-018279 filed on Feb. 8, 2021, incorporated herein by reference in its entirety.

BACKGROUND

1. Technical Field

The present disclosure relates to a vehicle.

2. Description of Related Art

There is a trend to digitize an instruction manual for an industrial product. In this regard, for example, Japanese Unexamined Patent Application Publication No. 2016-162155 (JP 2016-162155 A) discloses an invention relating to an electronic manual system that can display a vehicle manual by a portable terminal.

SUMMARY

The present disclosure is to improve the convenience of an electronic manual.

A first aspect of the present disclosure relates to a vehicle including one or more interface devices, and a member on which an image obtained by encoding digital data for giving guidance on a use method of the interface device to a user is printed. In the vehicle, the member is disposed in a vicinity of the corresponding interface device.

A second aspect of the present disclosure relates to a vehicle system including a vehicle, and a portable terminal. Specifically, the vehicle includes one or more interface devices, and a member on which an image obtained by encoding digital data for giving guidance on a use method of the interface device to a user is printed. The portable terminal includes a controller configured to execute optically reading the member to acquire the digital data, and outputting the guidance on the use method of the corresponding interface device based on the digital data.

A third aspect of the present disclosure relates to an information processing device including a controller. The controller is configured to execute optically reading an image obtained by encoding digital data for identifying an electronic manual for a vehicle to acquire the digital data. The controller is configured to execute, in a case where the electronic manual indicated by the digital data is not stored in the information processing device, acquiring the electronic manual in response to the digital data. The controller is configured to execute, in a case where the electronic manual indicated by the digital data is stored in the information processing device, outputting the stored electronic manual.

In addition, examples of another aspect include a program that causes a computer to execute a method executed by the information processing device described above and a computer-readable storage medium that non-transitorily stores the program.

According to the present disclosure, the convenience of the electronic manual can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
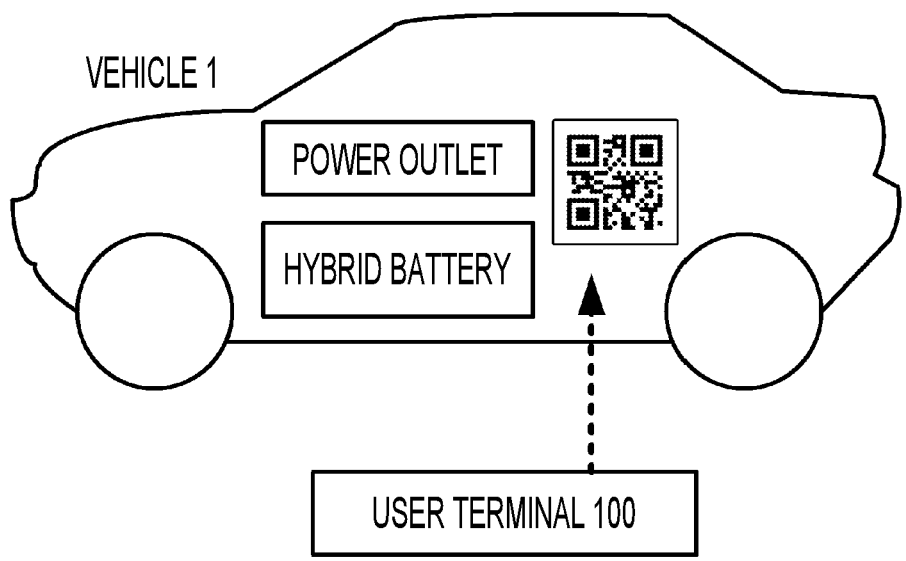
FIG. 1 is a system configuration diagram of a vehicle system according to an embodiment.

One aspect of the present disclosure relates to a vehicle including a plurality of interface devices.

Specifically, the vehicle includes one or more interface devices, and a member on which an image obtained by encoding digital data for giving guidance on a use method of the interface device to a user is printed, in which the member is disposed in a vicinity of the corresponding interface device.

The interface device is a device that inputs or outputs information or an electric power. Examples of the interface device include an operation panel, a touch panel, and a display device provided in an in-vehicle device. In addition, the interface device may be a socket that supplies the electric power to an outside of the vehicle, a connector that connects an external device, or the like.

Some of such interface devices provided in the vehicle are not used on a daily basis. Examples of such an interface device include an outlet (power outlet) that supplies the electric power to the outside of the vehicle in an emergency, such as a power failure. However, in a case where a user tries to use the interface device that is not used on a daily basis, there may be a problem that the user does not know a use method of the interface device.

The user needs to refer to a manual for the vehicle to know the use method of the device, but in a case where the manual is digitized, the user should first start downloading of an electronic manual, and thus needed information cannot be immediately obtained. Even in a case where the user already have the electronic manual, it is not easy to find a needed part from a long manual.

In order to solve the problem, in the vehicle according to a first aspect of the present disclosure, a member on which an image obtained by encoding digital data for giving guidance on the use method of the interface device to the user is printed is pasted in the vicinity of the corresponding interface device.

The digital data for giving the guidance on the use method of the interface device may be data (such as a URL or a URI) indicating a location of the electronic manual on a network or may be data (data representing a page number or a link to a bookmark) indicating a description place in the electronic manual, for example. By pasting the image (for example, a two-dimensional code) obtained by encoding such digital data in the vicinity of the interface device, the user can be guided to the electronic manual.

The electronic manual may be provided in a format of a document file, or may be provided as support software for each vehicle model or each manufacturer.

In addition, the digital data may include first data indicating a distribution location of the electronic manual corresponding to the vehicle on the network.

For example, in a case where the electronic manual is provided as the document file, the first data may be a network address indicating a location of the document. In addition, in a case where the electronic manual is provided as the software, the first data may be an identifier of the distribution location (for example, an application store) of the software or the network address.

In addition, the digital data may include second data indicating a place at which the use method of the corresponding interface device is described in the electronic manual corresponding to the vehicle.

For example, in a case where the electronic manual is provided as the document file, the second data may be data representing the page number or the link to the bookmark in the document.

In addition, the digital data may include both of the first data indicating the distribution location of the electronic manual corresponding to the vehicle on the network and the second data indicating the place at which the use method of the corresponding interface device is described in the electronic manual.

A second aspect of the present disclosure relates to a vehicle system including the vehicle described above, and a portable terminal.

The portable terminal includes a controller configured to execute optically reading the member to acquire the digital data, and outputting the guidance on the use method of the corresponding interface device based on the digital data.

As described above, by reading the image (for example, the two-dimensional code) obtained by encoding the digital data by the portable terminal, the user can refer to the electronic manual on the portable terminal.

In addition, the controller provided in the portable terminal may be configured to, in a case where the electronic manual is not stored in the portable terminal, acquire the electronic manual in response to the first data.

In addition, the controller provided in the portable terminal may be configured to, in a case where the electronic manual is stored in the portable terminal, output the stored electronic manual.

In addition, the controller provided in the portable terminal may be configured to, in a case where the electronic manual is stored in the portable terminal, output a place indicated by the second data in the stored electronic manual.

With such a configuration, the use of the same two-dimensional code enables to cause the portable terminal to execute a needed operation among a plurality of operations, such as "acquisition of the electronic manual", "activation of the electronic manual", and "access to a needed page". As a result, appropriate information in the electronic manual can be promptly provided to the user.

Note that the "activation of the electronic manual" may be a process of opening the electronic manual provided as the document file, or a process of activating the support software that provides the electronic manual.

In addition, a third aspect of the present disclosure is the portable terminal described above.

Specifically, the portable terminal includes the controller configured to execute optically reading an image obtained by encoding digital data for identifying an electronic manual for a vehicle to acquire the digital data. The controller is configured to execute, in a case where the electronic manual indicated by the digital data is not stored in the information processing device, acquiring the electronic manual in response to the digital data. The controller is configured to execute, in a case where the electronic manual indicated by the digital data is stored in the information processing device, outputting the stored electronic manual.

Hereinafter, embodiments of the present disclosure will be described based on the drawings. The configurations of the embodiments described below are examples, and the present disclosure is not limited to the configurations of the embodiments.

First Embodiment

An outline of a vehicle system according to a first embodiment will be described with reference to FIG. 1. The vehicle system according to the present embodiment is configured by a vehicle 1 and a user terminal 100.

The vehicle 1 is a hybrid vehicle having a function of supplying a power source to an outside of the vehicle. The vehicle 1 has a battery for driving (hybrid battery) and a power outlet that is an interface that supplies the electric power stored in the hybrid battery to the outside of the vehicle.

The user terminal 100 is a portable terminal owned by the user of the vehicle 1. The user terminal 100 has a function of optically reading the two-dimensional code pasted to the vehicle 1 and a function of providing the electronic manual for the vehicle 1 based on the read two-dimensional code.

The two-dimensional code obtained by encoding the digital data for giving the guidance on the electronic manual for the vehicle is pasted to the vehicle 1, and the user of the vehicle can access to the electronic manual for the vehicle 1 by reading the two-dimensional code by the user terminal 100.

The components of the system will be described in detail.
FIG. 2 is a block diagram schematically showing an example of a configuration of the vehicle 1 shown in FIG. 1. The vehicle 1 is configured by a hybrid battery 11, a motor generator 12, a power control unit 13, a hybrid ECU 14, an inverter 15, and a power outlet 16.

Note that in the present example, the hybrid ECU that executes a control of charging and discharging is described as an example of an electronic control unit (ECU) mounted on the vehicle 1, but another ECU, such as an engine ECU or a body ECU, that executes a control other than charging and discharging of the battery may be mounted on the vehicle 1.

The hybrid battery 11 is a battery that supplies the electric power for driving the vehicle 1. The hybrid battery 11 supplies the electric power to the motor generator 12 and is charged by the electric power generated by the motor generator 12. As the hybrid battery 11, for example, a secondary battery, such as a nickel hydrogen battery or a lithium ion battery, can be used.

The motor generator 12 is a motor generator functioning as a motor or a generator. The motor generator 12 is connected to a drive shaft via a power split device, and can convert the electric power into kinetic energy or convert kinetic energy into the electric power.

The power control unit 13 is a unit that converts the electric power for driving. Specifically, the power control unit 13 is configured by an inverter that converts the electric power from a direct current to an alternating current, a converter that executes a control of a voltage, and the like.

The hybrid ECU 14 is an electronic control unit that executes a control of traveling by the electric power. The hybrid ECU 14 executes a control of driving the drive shaft by the electric power stored in the hybrid battery 11, recovering the electric power by a regenerative brake, or the like. In addition, the hybrid ECU 14 executes, as needed, a control of supplying the electric power stored in the hybrid battery 11 to the outside.

Note that in a case where the vehicle 1 is a plug-in hybrid vehicle, the hybrid ECU 14 can also execute a control of charging the hybrid battery 11 by an external power source.

The inverter 15 converts the electric power from the direct current to the alternating current in order to supply the electric power stored in the hybrid battery 11 to the outside.

The power outlet 16 is a unit that supplies the electric power to the outside of the vehicle. The power outlet 16 has a power source connector (socket), and the electric power can be supplied to the outside of the vehicle by inserting a plug into the power outlet 16.

The vehicle 1 can switch a mode from a traveling mode to a mode of supplying the electric power to the outside of the vehicle by executing a predetermined operation by the user. The control is executed by the hybrid ECU 14. However, in a case where a user who is unfamiliar with the operation attempts to switch the mode, the user should refer to the manual for the vehicle to know an operation method.

Therefore, according to the present embodiment, the user is guided to the electronic manual for the vehicle by using the two-dimensional code pasted in the vicinity of the interface (that is, the power outlet 16) that outputs the electric power.

Figure 3:
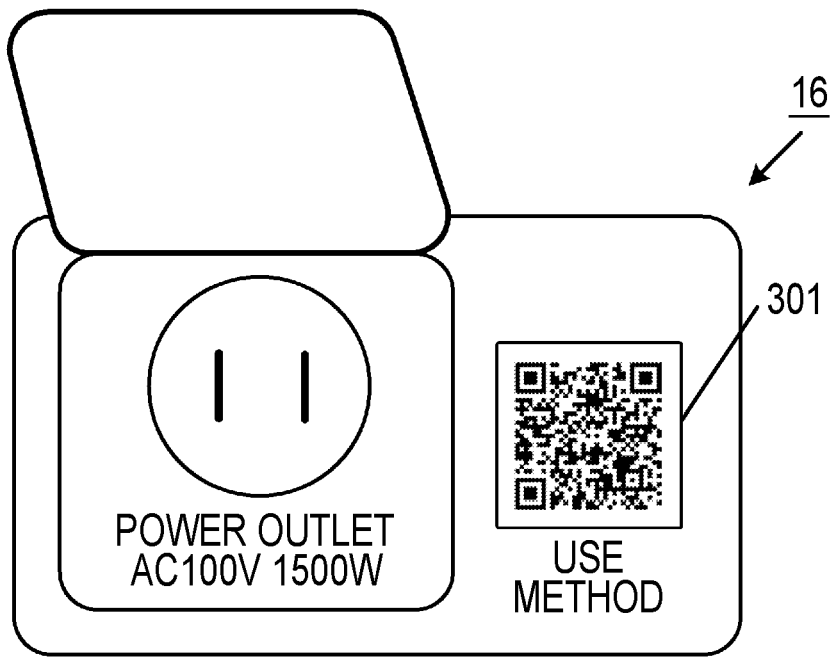
FIG. 3 is a diagram showing an appearance of a power outlet.

FIG. 3 is a diagram showing an appearance of the power outlet 16 provided in the vehicle 1. The power outlet 16 is disposed, for example, in a luggage space (luggage compartment) and can be used by opening a protection lid.

As shown in FIG. 3, the two-dimensional code is pasted in the vicinity of the power outlet 16. By reading the code by the user terminal 100 described below, the user terminal 100 can provide the electronic manual (particularly, a description regarding a use method of the power outlet) to the user. The details of the information encoded in the two-dimensional code and a method of providing the electronic manual by the user terminal 100 will be described below.

Then, the user terminal 100 will be described.

Figure 2:
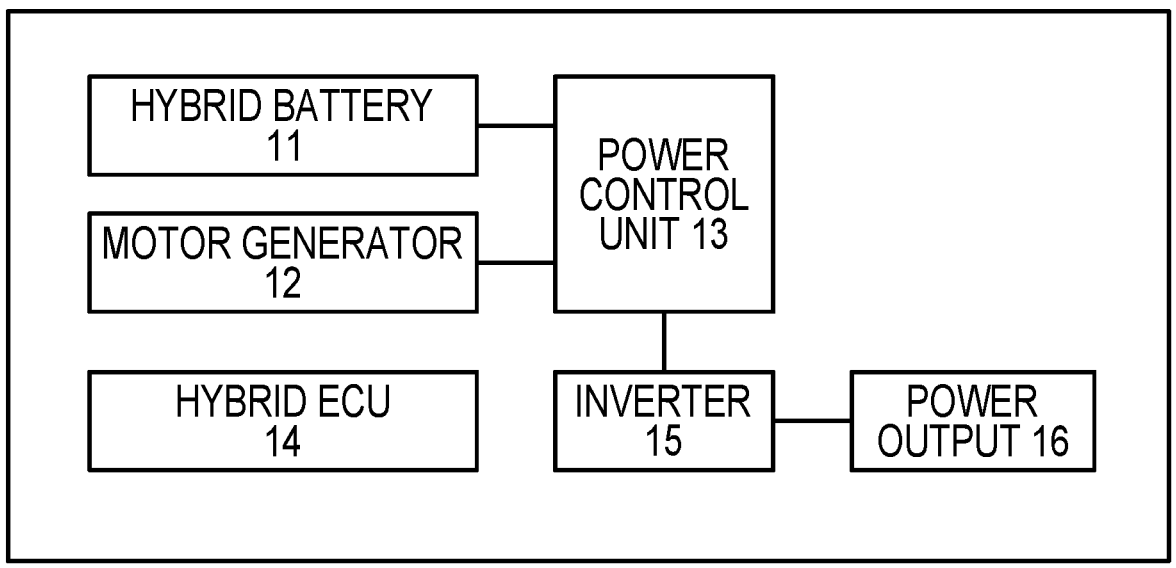
FIG. 2 is a block diagram showing components provided in a vehicle.
Figure 4:
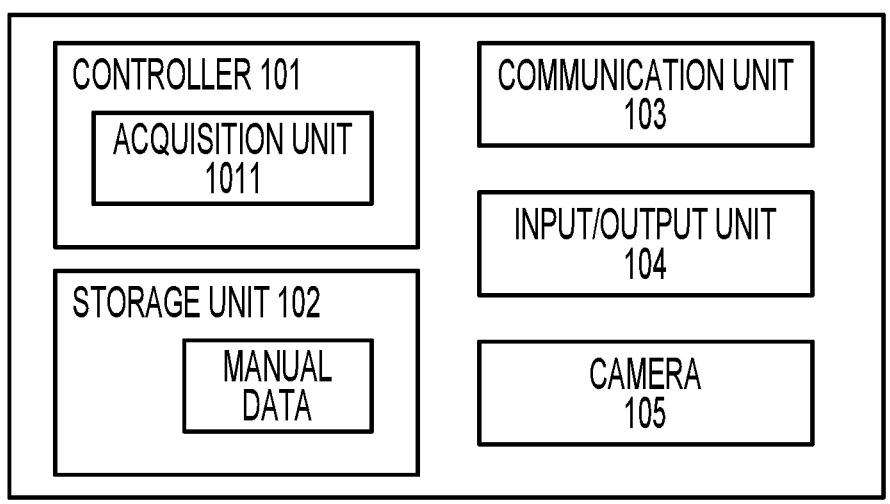
FIG. 4 is a block diagram showing components provided in a user terminal.

FIG. 4 is a block diagram schematically showing an example of a configuration of the user terminal 100 shown in FIG. 1.

The user terminal 100 can be configured by a general purpose computer. That is, the user terminal 100 can be configured as a computer including a processor, such as a CPU or a GPU, a main storage device, such as a RAM or a ROM, and an auxiliary storage device, such as an EPROM, a hard disk drive, or a removable medium. An operating system (OS), various programs, various tables, and the like are stored in the auxiliary storage device, and the programs stored therein are executed, so that each function that meets a predetermined purpose as described below can be realized. Note that a part or all of the functions may be realized by a hardware circuit, such as an ASIC or an FPGA.

The user terminal 100 is a portable computer owned by the user of the vehicle 1. The user terminal 100 may be a smartphone, a tablet terminal, or another portable computer.

The user terminal 100 is configured by a controller 101, a storage unit 102, a communication unit 103, an input/output unit 104, and a camera 105.

The controller 101 is means for executing a control of the user terminal 100. The controller 101 is configured by, for example, an information processing unit, such as a central processing unit (CPU) or a graphics processing unit (GPU).

The controller 101 includes an acquisition unit 1011 as a functional module. The functional module may be realized by executing a program stored in storage means, such as the ROM, by the CPU.

The acquisition unit 1011 decodes the two-dimensional code read by the camera 105 described below, and provides the electronic manual for the vehicle to the user based on the obtained information. The detailed operation will be described below. In the present embodiment, the acquisition unit 1011 realizes a function thereof by an application program (support software) provided by the manufacturer of the vehicle 1.

The storage unit 102 is means for storing the information, and is configured by a storage medium, such as the RAM, a magnetic disk, or a flash memory. Various programs executed by the controller 101, data used by the programs, and the like are stored in the storage unit 102. In addition, the storage unit 102 stores the electronic manual for the vehicle 1 downloaded from the network.

The communication unit 103 is an interface that connects the user terminal 100 to a mobile communication network. The communication unit 103 can communicate with a wide area network (for example, the Internet) by using, for example, the mobile communication network, a wireless LAN, and Bluetooth (registered trademark).

The input/output unit 104 is means for receiving an input operation executed by the user and presenting the information to the user. Specifically, the input/output unit 104 is configured by the touch panel and control means thereof, and a liquid crystal display and control means thereof. The touch panel and the liquid crystal display are configured by one touch panel display in the present embodiment. In addition, the input/output unit 104 may include a speaker or the like that outputs a voice.

The camera 105 is an optical unit including an image sensor that acquires an image.

Hereinafter, the details of the two-dimensional code pasted to the vehicle 1 and the operation of the user terminal 100 that reads the two-dimensional code will be described.

Figure 5:
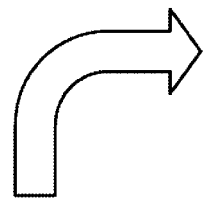
FIG. 5 is a diagram describing information encoded in a two-dimensional code according to a first embodiment.
Figure 5:
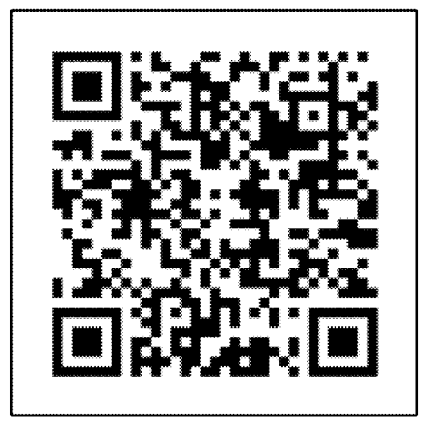

FIG. 5 is a diagram describing the information encoded in the two-dimensional code pasted in the vicinity of the power outlet 16. As shown in FIG. 5, the two-dimensional code is obtained by encoding the following three types of character strings.

(1) a character string (model identifier) that identifies a model of the vehicle 1

(2) a character string (locator) that indicates the location of the electronic manual corresponding to vehicle 1

(3) a character string (pointer) that indicates a place at which an external power supply method is described in the electronic manual The model identifier is an identifier that uniquely identifies the model of the vehicle. The model identifier is used to identify whether or not the electronic manual is stored in the user terminal 100, for example.

The locator is, for example, a character string representing the location of the electronic manual on the Internet, and is typically the uniform resource locator (URL), the uniform resource identifier (URI), or the like. For example, in a case where the electronic manual is provided as the document file, the locator may be the network address indicating the location of the document. In addition, in a case where the electronic manual is provided as the software, the locator may be the identifier or the network address of the distribution location (for example, an application store) of the software.

The pointer is data indicating a place at which the use method of the power outlet 16 (that is, the external power supply method) is described in the electronic manual for the vehicle 1. The pointer may be the page number, a section number, or the like of the electronic manual. In addition, in a case where a plurality of the bookmarks is defined in the electronic manual, the pointer may be the identifiers of the corresponding bookmarks.

The user terminal 100 (acquisition unit 1011) that reads such a two-dimensional code executes the following operations.

(1) First, the user terminal 100 determines whether or not the electronic manual for the vehicle indicated by the model identifier has been downloaded. Here, in a case where the corresponding electronic manual has not been acquired, the user terminal 100 acquires the electronic manual disposed on the network in response to the locator.

(2) In a case where the corresponding electronic manual has already been acquired, the user terminal 100 opens the electronic manual. For example, in a case where the electronic manual is the application program, the user terminal 100 activates the application program. In addition, the electronic manual is the document file, the user terminal 100 activates a reader associated with the document file to read the document file.

(3) Further, the user terminal 100 displays a predetermined place indicated by the pointer from among a plurality of pages of the electronic manual.

By continuously executing these operations, the user can refer to a needed place of the electronic manual simply by executing an operation of reading the two-dimensional code.

Figure 6:
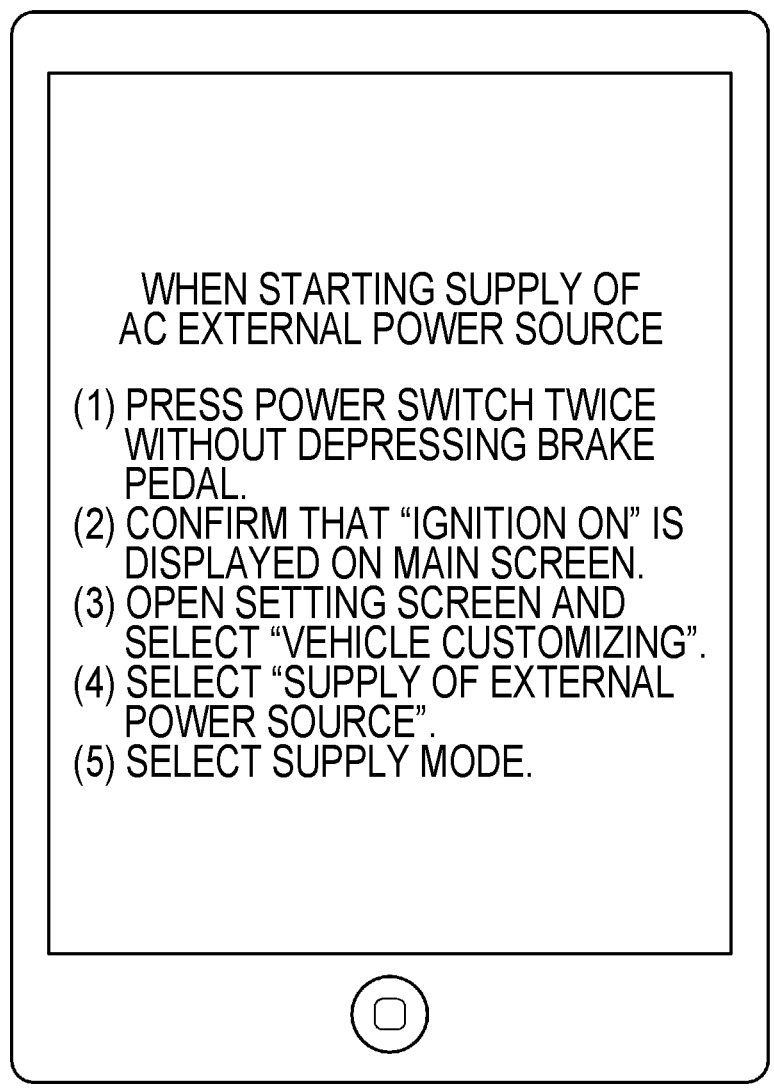
FIG. 6 is a display example of an electronic manual provided by the user terminal.

FIG. 6 is an example of the electronic manual for the vehicle 1 displayed by the user terminal 100.

Figure 7:
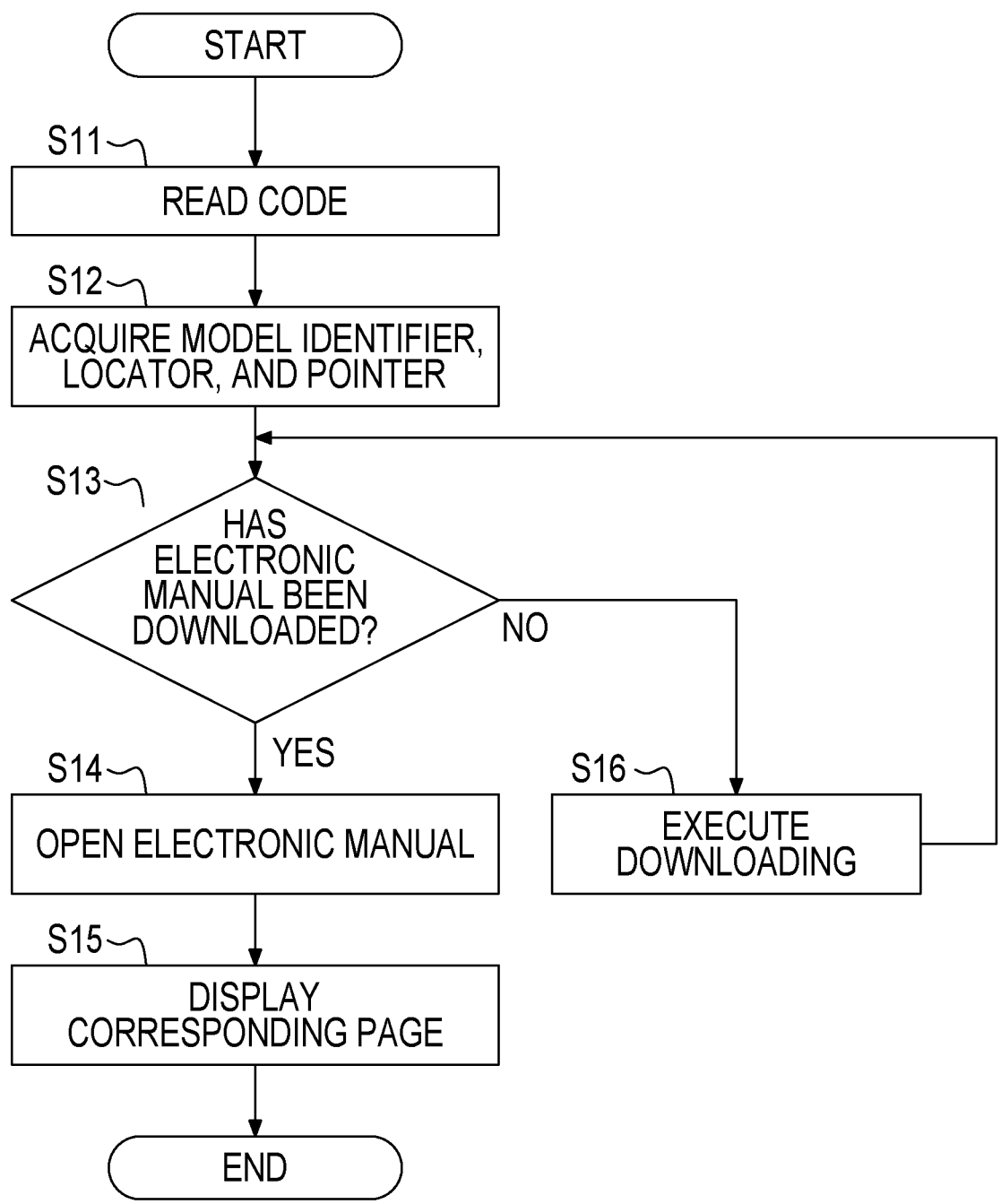
FIG. 7 is a flowchart of a process executed by the user terminal.

FIG. 7 is a flowchart of a process executed by the user terminal 100 (controller 101). The process is started by the acquisition unit 1011 in a case where the user executes the operation of reading the two-dimensional code.

First, in step S11, the user terminal 100 read the two-dimensional code via the camera 105. The read two-dimensional code is decoded by a predetermined procedure and converted into the character string.

Next, in step S12, the user terminal 100 extracts the model identifier, the locator, and the pointer from the character string obtained by the conversion.

Next, in step S13, the user terminal 100 determines whether or not the electronic manual for the vehicle indicated by the model identifier has been already downloaded. Here, in a case where the electronic manual has not yet been downloaded, the process proceeds to step S16, and the user terminal 100 executes downloading of the electronic manual in response to the locator. Note that in a case where the operation by the user (for example, an operation of installing the application program) is needed, the user terminal 100 may output guidance prompting the operation.

In a case where the electronic manual has already been downloaded in step S13, the process proceeds to step S14, and the user terminal 100 opens the electronic manual. For example, in a case where the electronic manual is the application program, the user terminal 100 activates the application program. In addition, the electronic manual is the document file, the user terminal 100 activates the reader associated with the document file to read the document file.

Then, in step S15, the user terminal 100 displays a target page in the electronic manual in response to the pointer. Note that in a case where the page can be designated when the electronic manual is activated, the user terminal 100 may execute the processes of steps S14 and S15 at the same time.

As described above, in the vehicle system according to the present embodiment, the two-dimensional code for giving the guidance on the use method of the interface device to the user is pasted in the vicinity of the interface device of the vehicle 1. The user who visually recognizes the interface device inevitably visually recognizes the two-dimensional code, so that the user can recognize that the electronic manual can be referred to by reading the code. Further, the user terminal 100 that reads the two-dimensional code executes the operations, such as the "acquisition of the electronic manual", the "activation of the electronic manual", and the "access to a needed page". As a result, the manual for the interface device can be provided to the user without executing complicated operations.

Modification Example of First Embodiment

According to the first embodiment, as shown in FIG. 3, the two-dimensional code is pasted next to an insertion port of the plug, but a pasting position of the two-dimensional code is not limited to the above position.

Figure 8A:
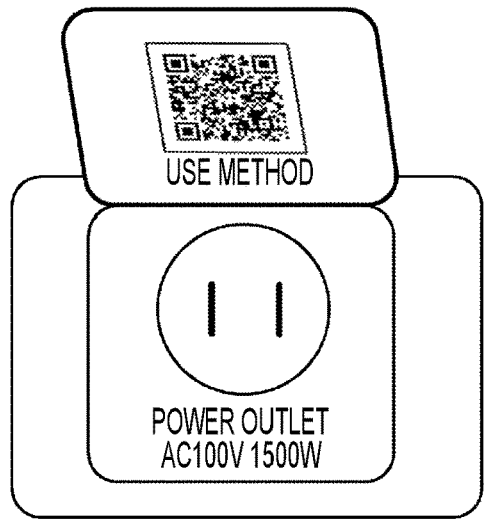
FIGS. 8A to 8C are diagrams showing modification examples of the appearance of the power outlet.
Figure 8B:
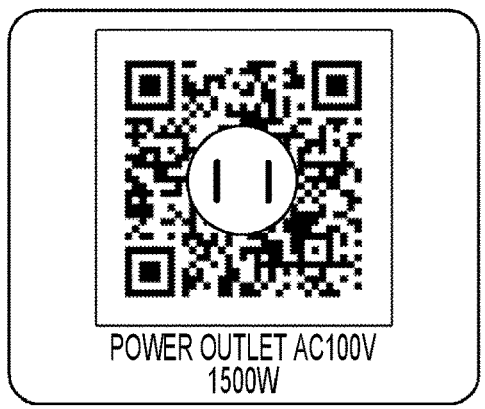

For example, as shown in FIG. 8A, the two-dimensional code may be pasted to a back surface of the protection lid provided at the insertion port of the plug, or as shown in FIG. 8B, the two-dimensional code may be disposed so as to surround the insertion port of the plug. Note that in a case where the latter method is adopted, paying attention to a point that an error correction level of the two-dimensional code needs to be raised to a certain level or higher is needed.

With such a method, the presence of the two-dimensional code can be further clearly reported to the user.

In addition, according to the first embodiment, solely the two-dimensional code corresponding to the power outlet is described as an example, but the corresponding two-dimensional code may be pasted to each of the interface devices of the vehicle 1. The interface devices may be, for example, a control panel of the in-vehicle device (navigation device or air conditioner), a centralized switch provided on a steering wheel, and a power inlet (charging port).

In addition, according to the first embodiment, the two-dimensional code obtained by encoding the three types of data shown in FIG. 5 is described as an example, but in a case where the user terminal 100 handles solely one type of the vehicle model, the model identifier is not always requested. In addition, the data included in the two-dimensional code may be the locator and the pointer, or any one of the locator and the pointer. For example, in a case where it is known in advance that the user terminal 100 stores the electronic manual corresponding to a predetermined vehicle model, the two-dimensional code including solely the pointer may be used. In addition, in a case where the guidance solely on the distribution location of the electronic manual is given to the user, the two-dimensional code including solely the model identifier and the locator may be used.

Figure 8C:
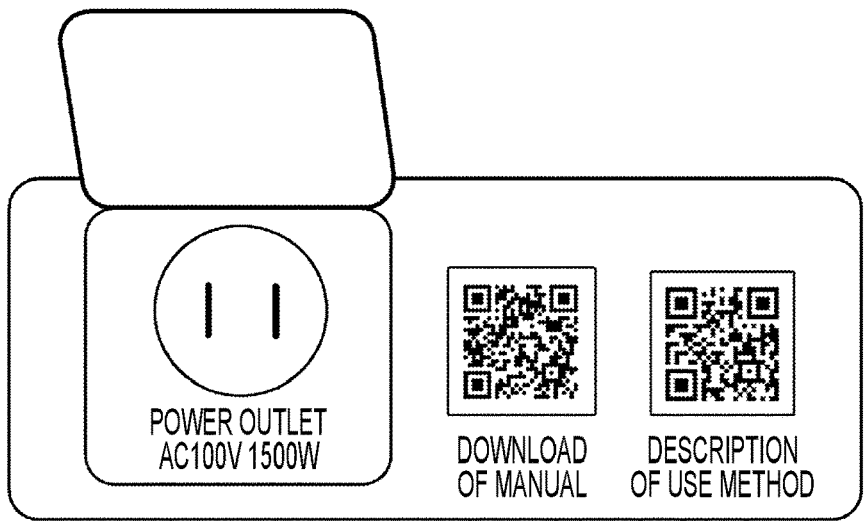

In addition, for example, as shown in FIG. 8C, the two-dimensional code including solely the locator and the two-dimensional code including solely the pointer may be disposed separately. In this case, the former may be disposed in one place in the vehicle and the latter may be disposed in the vicinity of the corresponding interface device.

Second Embodiment

The two-dimensional code can generally be read by the application software that is pre-installed on the smartphone or the like. For example, a general smartphone operating system (OS) has a function of passing a decoded URL to a browser in a case where the two-dimensional code is detected from a camera image.

However, the two-dimensional code including a plurality of pieces of information as shown in FIG. 5 can be read solely by dedicated application software. That is, the system according to the first embodiment cannot be used on the portable terminal on which the corresponding application software is not installed.

Figure 9:
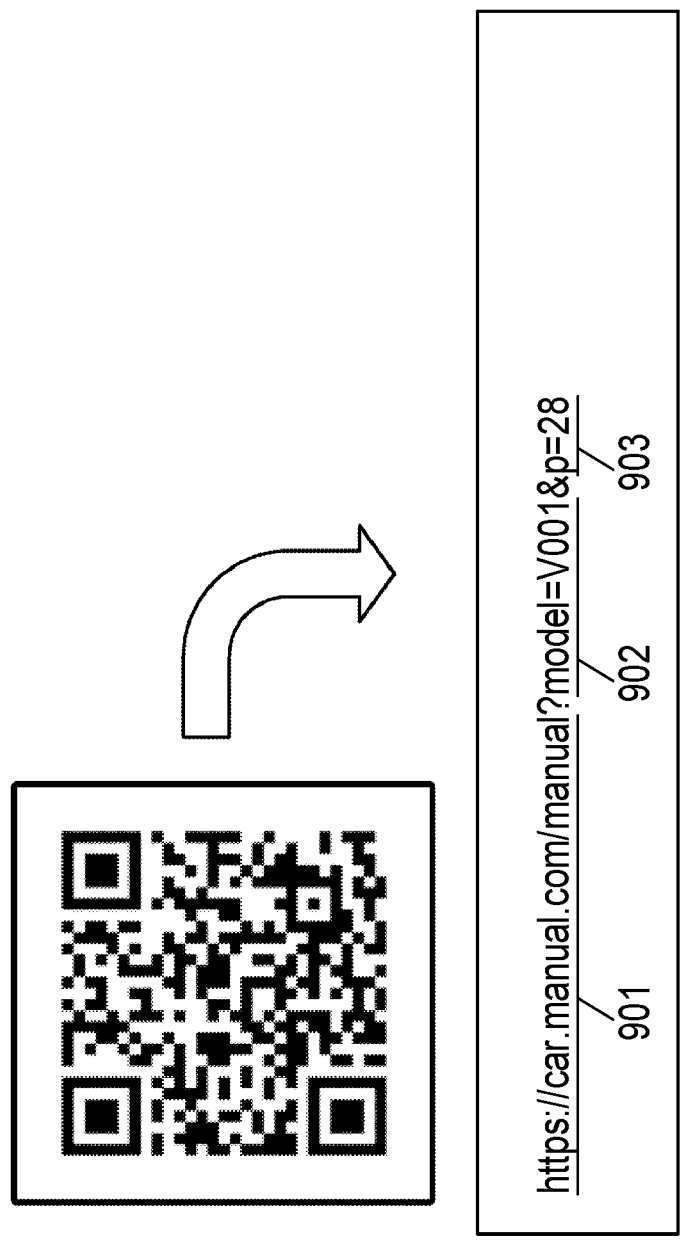
FIG. 9 is a diagram describing information encoded in a two-dimensional code according to a second embodiment.

Therefore, according to the second embodiment, this problem is solved by embedding the three types of data described above in the URL. FIG. 9 is an example of the information encoded in the two-dimensional code according to the second embodiment. According to the second embodiment, the model identifier, locator, and pointer are encoded as a single URL. In the example shown in FIG. 9, reference numeral 901 represents the locator, reference numeral 902 represents the model identifier, and reference numeral 903 represents the pointer. That is, the model identifier and the pointer are described as query parameters.

The user terminal 100 accesses to the decoded URL via the browser. In addition, a Web server that receives the transmitted query parameter (that is, a server that distributes the electronic manual) executes any of the following operations.

(1) The Web server interprets the query parameters and outputs the corresponding page of the electronic manual for the corresponding vehicle model.

For example, in a case of the example of FIG. 9, the Web server outputs the 28th page of the electronic manual corresponding to a model "V001". As a result, on the user terminal 100, the user can refer to the corresponding page of the electronic manual. In a case where this method is adopted, the electronic manual is downloaded to the user terminal 100 in page units.

(2) The Web server provides solely the electronic manual without interpreting the query parameters.

The Web server handles the query added to the URL as a dummy and recognizes solely a locator part. As a result, the user terminal 100 can download the whole electronic manual described in the locator. Note that in the present example, the electronic manual is provided as the support software.

Thereafter, the user activates the support software and reads the same two-dimensional code again. The support software that reads the two-dimensional code identifies the model identifier and the pointer included in the URL, and outputs the corresponding information in the stored electronic manual. For example, in a case of the example of FIG. 9, the Web server outputs the 28th page of the electronic manual corresponding to a model "V001". In this case, the support software interprets solely a query parameter part included in the URL.

Figure 10:
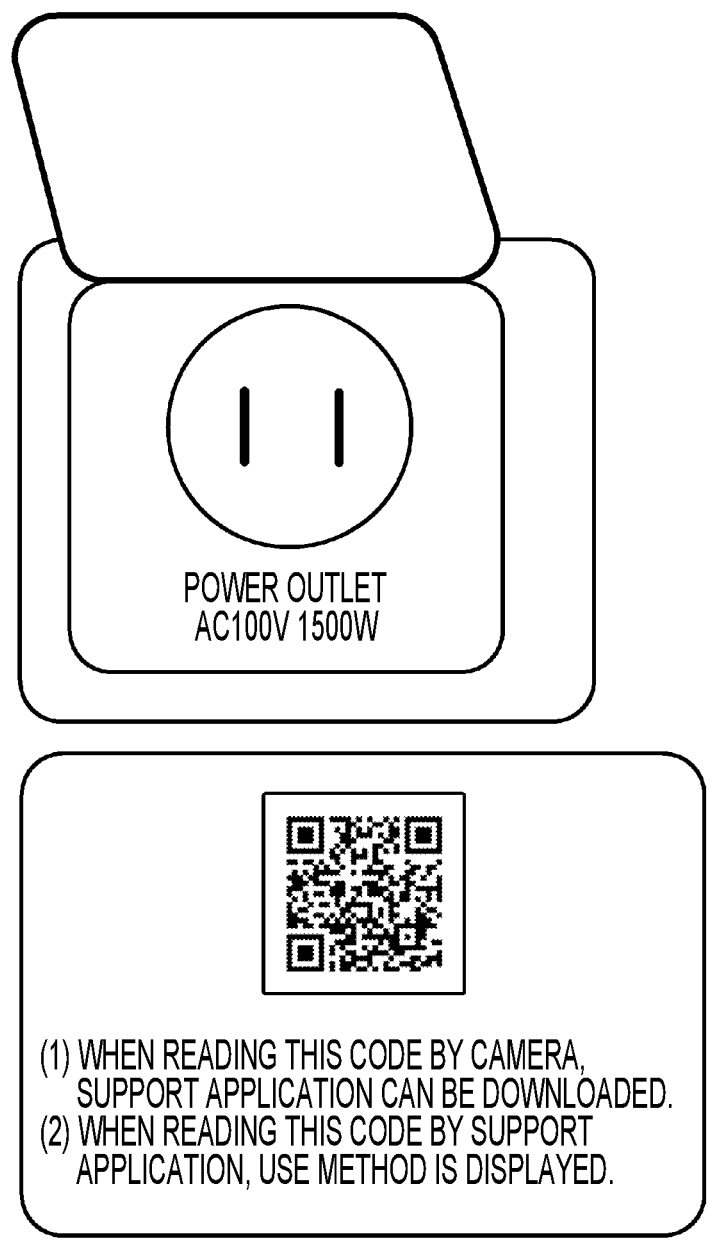
FIG. 10 is a diagram showing a modification example of the appearance of the power outlet.

Note that in a case where the method (2) described above is adopted, the user needs to read the two-dimensional code twice. Therefore, a sentence for giving guidance on the procedure may be described in the vicinity of the two-dimensional code. For example, by describing the information as shown in FIG. 10, the use method of the two-dimensional code can be transmitted to the user.

As described above, in the second embodiment, the needed information is embedded in the URL and encoded as the two-dimensional code. With such a configuration, two operations, the "acquisition of the electronic manual" and the "presentation of the needed part in the electronic manual", can be executed without prior preparation.

Modification Example

The embodiments described above are merely examples, and the present disclosure can be carried out with appropriate modifications within a range not departing from the gist of the disclosure.

For example, the process and the means described in the present disclosure can be freely combined and carried out as long as no technical inconsistency occurs.

In addition, in the description of the embodiments, the configuration in which the user is guided to the electronic manual by the two-dimensional code is described as an example, but the two-dimensional code obtained by encoding a manual for the vehicle itself may be generated.

In addition, the process executed by one device in the above description may be allocated and executed by a plurality of devices. Alternatively, the process executed by different devices in the above description may be executed by one device. In a computer system, what kind of the hardware configuration (server configuration) is used to realize each function can be flexibly changed.

The present disclosure can also be realized by supplying a computer program that implements the functions described in the embodiments described above to a computer, and reading and executing the program by one or more processors provided in the computer. Such a computer program may be provided to the computer by a non-transitory computer-readable storage medium that can be connected to a system bus of the computer, or may be provided to the computer via a network. Examples of the non-transitory computer-readable storage medium include any type of disk, such as a magnetic disk (floppy (registered trademark) disk or hard disk drive (HDD)), and an optical disk (CD-ROM, DVD disk, or Blu-ray disk), read only memory (ROM), random access memory (RAM), EPROM, EEPROM, magnetic card, flash memory, optical card, and any type of a medium suitable for storing an electronic instruction.

What is claimed is:

1. A vehicle comprising:
an interface device; and
a member on which an image obtained by encoding digital data for giving guidance on a use method of the interface device to a user is printed, wherein
the vehicle is capable of switching a mode from a traveling mode to a mode of supplying electric power to outside of the vehicle,
the interface device is an emergency power outlet including a power source connector that is provided with an insertion port, the emergency power outlet being configured to supply the electric power to the outside of the vehicle by inserting a plug into the insertion port, and
the member is disposed so as to surround the insertion port.

2. The vehicle according to claim 1, wherein the digital data includes first data indicating a distribution location of an electronic manual corresponding to the vehicle on a network.

3. The vehicle according to claim 1, wherein the digital data includes second data indicating a place at which the use method of the interface device is described in an electronic manual corresponding to the vehicle.

4. The vehicle according to claim 1, wherein the digital data includes both of first data indicating a distribution location of an electronic manual corresponding to the vehicle on a network and second data indicating a place at which the use method of the interface device is described in the electronic manual.

5. The vehicle according to claim 4, wherein:
the first data is represented by a URL; and
the second data is represented by a query parameter associated with the URL.

6. A vehicle system comprising:
a vehicle; and
a portable terminal, wherein:
the vehicle includes
an interface device, and
a member on which an image obtained by encoding digital data for giving guidance on a use method of the interface device to a user is printed,
the portable terminal includes a controller configured to execute
optically reading the member to acquire the digital data, and
outputting the guidance on the use method of the interface device based on the digital data,
the vehicle is capable of switching a mode from a traveling mode to a mode of supplying electric power to outside of the vehicle,
the interface device is an emergency power outlet including a power source connector that is provided with an insertion port, the emergency power outlet being configured to supply the electric power to the outside of the vehicle by inserting a plug into the insertion port, and
the member is disposed so as to surround the insertion port.

7. The vehicle system according to claim 6, wherein the digital data includes first data indicating a distribution location of an electronic manual corresponding to the vehicle on a network.

8. The vehicle system according to claim 7, wherein the controller provided in the portable terminal is configured to, in a case where the electronic manual is not stored in the portable terminal, acquire the electronic manual in response to the first data.

9. The vehicle system according to claim 8, wherein the controller provided in the portable terminal is configured to, in a case where the electronic manual is stored in the portable terminal, output the stored electronic manual.

10. The vehicle system according to claim 6, wherein the digital data includes second data indicating a place at which the use method of the interface device is described in an electronic manual corresponding to the vehicle.

11. The vehicle system according to claim 10, wherein the controller provided in the portable terminal is configured to, in a case where the electronic manual is stored in the portable terminal, output a place indicated by the second data in the stored electronic manual.

12. The vehicle system according to claim 6, wherein the digital data includes both of first data indicating a distribution location of an electronic manual corresponding to the vehicle on a network and second data indicating a place at which the use method of the interface device is described in the electronic manual.

13. The vehicle system according to claim 12, wherein the controller provided in the portable terminal is configured to
in a case where the electronic manual is not stored in the portable terminal, acquire the electronic manual in response to the first data, and
in a case where the electronic manual is stored in the portable terminal, output a place indicated by the second data in the stored electronic manual.

14. The vehicle system according to claim 12, wherein:
the first data is represented by a URL; and
the second data is represented by a query parameter associated with the URL.

* * * * *